United States Patent [19]

MacInnis et al.

[11] 3,947,555

[45] Mar. 30, 1976

[54] PROCESS FOR THE RECLAMATION OF UNCEMENTED TUNGSTEN CARBIDE POWDERS

[75] Inventors: Martin B. MacInnis; Clarence D. Vanderpool, both of Towanda, Pa.

[73] Assignee: GTE Sylvania Incorporated, Stamford, Conn.

[22] Filed: Oct. 23, 1973

[21] Appl. No.: 408,493

[52] U.S. Cl. .................................. 423/440; 51/307
[51] Int. Cl.² ......................................... C01B 31/34
[58] Field of Search ...................... 423/440; 51/307

[56] References Cited
UNITED STATES PATENTS

| | | | |
|---|---|---|---|
| 3,438,730 | 4/1969 | Shwayder | 423/440 |
| 3,786,133 | 1/1974 | Chiu | 423/440 |

OTHER PUBLICATIONS

Mellor — A Comprehensive Treatise on Inorganic & Theo. Chemistry — 1935, Vol. XIV, p. 513.

Primary Examiner—Oscar R. Vertiz
Assistant Examiner—Eugene T. Wheelock
Attorney, Agent, or Firm—Norman J. O'Malley; Donald R. Castle; William H. McNeill

[57] ABSTRACT

A process suitable for recovering refractory metal carbide values from contaminated uncemented refractory metal carbides containing an iron group metal comprises heating an admixture of the powders of the contaminated refractory metal carbides and glacial acetic acid to the boiling point of the admixture for at least about 30 minutes, the weight of the powders divided by the weight of the acid is less than 5, thereafter removing the resulting carbide solids from the acid and washing the solids with sufficient water to remove the residual acid and drying the solids.

4 Claims, No Drawings

PROCESS FOR THE RECLAMATION OF UNCEMENTED TUNGSTEN CARBIDE POWDERS

BACKGROUND OF THE INVENTION

1. Field of the Invention

This invention relates to the recovery of refractory metal carbides from contaminated uncemented refractory metal carbide powders. More particularly, it relates to a simple process wherein the refractory metal carbides are recovered as carbides.

2. Prior Art

In the production of cemented refractory metal carbides scrap materials are produced. These scrap materials can result from problems in a manufacturing step and can be either refractory metals in their cemented or uncemented state. For example, the binder is blended with refractory metal carbides generally in a ball mill. Too long milling produces a material which is too fine for some types of cemented carbides. Furthermore, there can be a contamination of the refractory metal carbide with iron and nickel. These materials are scrap materials and if no recovery of the valuable refractory metal is achieved, the process becomes more expensive. Cemented carbides, that is, after the binder is added and the material is then sintered, can also be out of specification and scrap material is produced. Most processes which heretofore have dealt with the reclamation of refractory metal carbides have been directed toward the reclamation from the cemented carbide state. It is believed apparent that the problems are different with materials in the cemented state and in the powdered state. Inherently, the processes used for metal recovery from cemented carbides is more difficult and time-consuming. It is believed to be more efficient if a simple process can be used to purify the refractory metal carbides which are in the uncemented or unsintered state yet are contaminated or are in a form which is not desirable for incorporation in a manufacturing process. It is believed, therefore, that a process which is simple and allows the recovery of refractory metal carbides in the carbide state and does not require the refractory metal values to be chemically processed and upgraded would be an advancement in the art.

OBJECTS AND SUMMARY OF THE INVENTION

It is an object of this invention to provide a practical method for recovering refractory metal carbide values from powdered refractory metal carbides which are contaminated with iron group metals.

It is a further object of this invention to recover refractory metal carbides from refractory metal carbide powders which are scrap powders.

It is an additional object of this invention to provide a simple process for recovering refractory metal values from uncemented refractory metal carbides.

These and other objects of this invention are achieved in one aspect of the invention by providing a process comprising heating uncemented refractory metal carbide powders contaminated with an iron group metal in a boiling solution of glacial acetic acid for at least about 30 minutes, the weight of the powders divided by the weight of the acid is a numerical value less than about 5. Thereafter, the solids are removed from the acid, washed with sufficient water to remove the residual acid and dried and are satisfactorily purified to enable them to be used as raw materials in a refractory metal carbide process.

DESCRIPTION OF THE PREFERRED EMBODIMENTS

For a better understanding of the present invention, together with other and further objects, advantages and capabilities thereof, reference is made to the following disclosure and appended claims in connection with the above description of some of the aspects of the invention.

Acetic acid, a very weak acid, is used in the practice of this invention. It has been found that when concentrated acids are used to recover refractory metal carbides, that are in a powdered state, that foaming can occur and the foam can contain relatively high levels of refractory metals. No foaming occurs with glacial acetic acid and since the process is conducted at the boiling point of glacial acetic acid (about 118°C) the process is easy to control. The theoretical amount of acetic acid can be used and the benefits of this invention can be realized, however generally an excess of acetic acid is used. Thus, the weight of the powders divided by the weight of glacial acetiic acid will result in a numerical value less than 5. Although the foregoing numerical value can be even less than 0.01, the excess of acetic acid is too great when economical considerations are taken into account. Preferred values of the weight of powders to the weight of glacial acetic acid range from about 0.05 to about 0.15. Generally, at least about 1 hour is used to assure that essentially all of the trace metals are removed from the refractory metal carbide when the foregoing ratios are used. About two hours is generally required to remove essentially all of the cobalt from the refractory metal carbide. To more fully illustrate the subject invention the following detailed example is presented. All parts, percentages and proportions are by weight unless otherwise indicated.

EXAMPLE I

About 20 parts of tungsten carbide containing about 9% cobalt and 1.6% iron is charged into about 200 parts of glacial acetic acid. The material is heated to the boiling point of about 118°C for about 1 hour. The solid materials are removed, washed and dried and analyzed and are found to contain 1.7% cobalt and 0.08% iron thus indicating that iron is very effectively removed and the cobalt content is appreciably lower. The material can be milled with sufficient additional cobalt to yield a satisfactory material for sintering to the cemented carbide state thereby enabling essentially 100% recovery of the tungsten values contained in the material.

Substantially similar results are achieved when other refractory metals are present in the cemented carbides. Additionally, carbides which are contaminated with nickel can be recovered in the above manner. Increasing the time to about 2 hours lowers the cobalt content to a level below about 1%. Beyond 24 hours no further decrease is detected.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process suitable for recovering refractory metal carbides comprising:
   a. forming an admixture containing uncemented tungsten carbide powder contaminated with at least one iron group metal and glacial acetic acid wherein the weight of said powders divided by the weight of said acid is a numerical value less than about 5;
   b. maintaining said admixture at its boiling point for at least about 30 minutes;
   c. separating the resulting solids from said acid; and
   d. removing the residual acid from said solids.

2. A process according to claim 1 wherein said numerical value is from about 0.05 to about 0.15.

3. A process according to claim 1 wherein said boiling point is maintained for about 1 to 5 hours.

4. A process according to claim 3 wherein said carbide is contaminated with cobalt.

* * * * *